(12) United States Patent
Bayramian et al.

(10) Patent No.: US 8,682,125 B2
(45) Date of Patent: Mar. 25, 2014

(54) METHOD AND SYSTEM FOR EDGE CLADDING OF LASER GAIN MEDIA

(75) Inventors: Andrew James Bayramian, Manteca, CA (US); John Allyn Caird, San Francisco, CA (US); Kathleen Irene Schaffers, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 531 days.

(21) Appl. No.: 12/784,047

(22) Filed: May 20, 2010

(65) Prior Publication Data

US 2011/0286709 A1 Nov. 24, 2011

(51) Int. Cl.
*H01S 3/00* (2006.01)
*G02B 6/02* (2006.01)
*H01S 3/094* (2006.01)

(52) U.S. Cl.
CPC .............................. *H01S 3/094007* (2013.01)
USPC ....................................................... 385/123

(58) Field of Classification Search
USPC ....................................................... 385/123
See application file for complete search history.

(56) References Cited

U.S. PATENT DOCUMENTS

| | | | | |
|---|---|---|---|---|
| 4,849,036 | A * | 7/1989 | Powell et al. | 156/99 |
| 7,463,660 | B2 | 12/2008 | Hackel et al. | |
| 8,149,502 | B2 * | 4/2012 | Chen et al. | 359/341.1 |
| 2002/0159736 | A1 * | 10/2002 | Dejneka et al. | 385/127 |
| 2004/0036955 | A1 * | 2/2004 | Digonnet et al. | 359/341.1 |
| 2010/0220386 | A1 * | 9/2010 | Chen et al. | 359/341.3 |

OTHER PUBLICATIONS

"Sapphire" Wikipedia entry, 9 pages total; retrieved from the internet: <http://en.wikipedia.org/wiki/Sapphire>.

Aoyama et al., "Status and Future Prospects of a JAERI PW Ti:Sapphire Laser," presented in First International Conference on Ultrahigh Intensity Lasers, Granlibakken Hotel and Resort, Tahoe City, CA, Oct. 4, 2004, 35 pages total.
Emmet et al., "Beryllium Diffusion Coloration of Sapphire: A summary of ongoing experiments," AGTA-GTC, Sep. 4, 2002; can be retrieved from the Internet: <http://web.archive.org/web/20070403091750/http://www.agta.org/consumer/gtclab/treatedsapps04.htm>.
Emmett et al., "Beryllium Diffusion of Ruby and Sapphire," Gems & Gemology, Summer 2003, 39(2):84-135; retrieved from the Internet: <http://lgdl.gia.edu/pdfs/su03a1.pdf>.
Hughes, "There's a Rumble in the Jungle: The Sapphire Face-lift Face-off Saga,", 1990, 17 pages total.; retrieved from the Internet: <http://www.ruby-sapphire.com/blue_surface_diffusion.htm>.
Kabyshev et al., "Effects of Fe-Ion Irradiation and Annealing on the Optical Absorption in Sapphire," Inorganic Materials, 2006; 42(7):756-762.
Ple, "Design and demonstration of a high-energy booster amplifier for a high-repetition rate petawatt class laser system," Optics Letters, 2007; 32(3):238-240.

* cited by examiner

*Primary Examiner* — Eric Wong
(74) *Attorney, Agent, or Firm* — Kilpatrick Townsend & Stockton

(57) ABSTRACT

A gain medium operable to amplify light at a gain wavelength and having reduced transverse ASE includes an input surface and an output surface opposing the input surface. The gain medium also includes a central region including gain material and extending between the input surface and the output surface along a longitudinal optical axis of the gain medium. The gain medium further includes an edge cladding region surrounding the central region and extending between the input surface and the output surface along the longitudinal optical axis of the gain medium. The edge cladding region includes the gain material and a dopant operable to absorb light at the gain wavelength.

10 Claims, 4 Drawing Sheets

METHOD AND SYSTEM FOR EDGE CLADDING OF LASER GAIN MEDIA

STATEMENT AS TO RIGHTS TO INVENTIONS MADE UNDER FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawerence Livermore National Laboratory.

BACKGROUND OF THE INVENTION

High power solid-state lasers, especially ones that utilize solid state gain media and operate at relatively high gain, typically need a mechanism of suppressing the naturally occurring transverse gain that can lead to losses from amplified spontaneous emission (ASE) and/or to parasitic oscillation. Such deleterious ASE and parasitic oscillation effects reduce the gain available to amplify an input pulse in an amplifier application or the resonant mode in a laser application.

One approach that has been utilized to suppress ASE and to suppress the onset of parasitic oscillations involves bonding an absorbing material to the edges of the gain medium (i.e., adding an edge cladding structure). If the index of refraction of the bonded absorbing material substantially matches that of the gain medium, a substantial portion of the ASE is coupled out of the gain media and into the absorbing material before it can reach a level sufficient to depopulate the excited state and thus reduce or clamp the gain. In general, such claddings include a material that is refractive index matched to the laser gain material and which contains a dopant that absorbs at the laser (ASE) frequency. A number of different materials have been used for cladding, ranging from sprayed-on glass fits to liquids to castings of monolithic glass.

As an example, large neodymium glass laser disks for disk amplifiers such as those that were used in the Nova laser program utilized an edge cladding that absorbed at 1 µm. The edge cladding prevented edge reflections from causing parasitic oscillations that would otherwise have depleted the gain. Another approach is to use a room temperature-vulcanized (RTV) silicone rubber that is poured about the peripheral edge of the laser disk. Plates of filter glass are embedded in the rubber to absorb ASE. This approach provides a low-cost edge cladding that can be used on a large laser system that incorporates glass gain media.

In crystal and/or ceramic media, the index of refraction is usually higher than that of glass (e.g., up to about 1.9) and thus an edge cladding material with an index of refraction of about 1.5 cannot effectively couple out ASE. For normal incidence, the fraction of light reflected in propagating from a material of index $n_1$ to a material of $n_2$ is given by $$R = \left(\frac{n_2 - n_1}{n_2 + n_1}\right)^2.$$

For light propagating from a material of index 1.9 into a material having an index of 1.5, 1.4% of the light is reflected. For steeper angles, the reflection percentage gets substantially higher and at the critical angle, all of the light is totally internally reflected. One approach to provide an edge cladding is to diffusion bond a doped crystal of the same material to the outer edges of the gain crystal in order to absorb the ASE due to the gain media. However, because diffusion bonding often requires mating two very flat ($<10/\lambda$) surfaces and applying both pressure and heat, it is a very difficult, expensive, and time consuming process with low yield and bonds may have gaps or fail in operation. In addition, since the main crystal and edge cladding crystal are in intimate contact after diffusion bonding, heating of the edge cladding by the ASE introduces stresses across the bond interface, which can fracture either the crystal or the edge cladding. Such an approach is also time consuming and expensive.

Another approach to reduce the level of transverse ASE is to roughen the edges of the gain media with bead blasting or other means. This creates very small reflection sites at the edge of the gain media, which generates large diffraction losses at the edges. However, such a technique, on its own, does not in general sufficiently defeat ASE gain. Other approaches including using a dye or liquid containing the absorber and flowing it around the edge of the slab, painting the edge of the slab with a solid state absorber, and the like, are characterized by other drawbacks. Thus, there is a need in the art for improved methods and systems for edge cladding high power gain media to reduce transverse ASE.

In the past, this has been accomplished with Ti:sapphire and other gain media with the following methods: bonding or gluing an absorber material to the edge of the slab. These methods have all been initially successful, but suffer from an inherent risk of failure as the bond or glue fails, the dye or liquid flow stops, the paint is scratched or burned, or the like.

SUMMARY OF THE INVENTION

According to the present invention, techniques related to optical systems are provided. More particularly, embodiments of the present invention relate to methods and systems for cladding the edge of gain media to reduce parasitic optical amplification in solid state laser materials. In a particular embodiment, atoms are diffused into the edges of a large aperture, high gain slab of solid state gain media (e.g., a Ti:sapphire amplifier slab) to suppress transverse ASE. The methods and systems described herein are also applicable to other amplifier and laser systems.

According to an embodiment of the present invention, a gain medium operable to amplify light at a gain wavelength and having reduced transverse ASE is provided. The gain medium includes an input surface and an output surface opposing the input surface. The gain medium also includes a central region including gain material and extending between the input surface and the output surface along a longitudinal optical axis of the gain medium. The gain medium further includes an edge cladding region surrounding the central region and extending between the input surface and the output surface along the longitudinal optical axis of the gain medium. The edge cladding region includes the gain material and a dopant operable to absorb light at the gain wavelength.

According to another embodiment of the present invention, a method of edge cladding a gain medium is provided. The method includes providing the gain medium and enclosing at least a portion of the gain medium in a dopant source. The method also includes heating the enclosed gain medium, diffusing a dopant from the dopant source into the gain medium to form an edge-clad gain medium, and cooling the edge-clad gain medium. The method further includes slicing the edge-clad gain medium into gain units and polishing the gain. The gain units can be gain slabs or gain rods.

According to yet another embodiment of the present invention, a method of fabricating an edge-clad gain medium is provided. The method includes providing the gain medium operable to amplify light at a gain wavelength and implanting ions operable to absorb light at the gain wavelength into a peripheral region of the gain medium. The method also includes annealing the implanted gain medium to form the edge-clad gain medium, slicing the edge-clad gain medium into gain units, and polishing the gain units. The gain units can be gain slabs or gain rods.

Numerous benefits are achieved by way of the present invention over conventional techniques. For example, the present techniques provide a method to reduce the level of transverse ASE and increase the gain available for signal amplification. Moreover, utilizing embodiments of the present invention, power levels for both lasers and amplifiers are increased in comparison with conventional techniques, resulting in high average power and high peak power handling capabilities. Furthermore, embodiments of the present invention provide for nearly identical index matching, resulting in increased absorption of light leading to parasitic loss. Additionally, embodiments of the present invention provide a monolithic solution with no moving parts or separate components, reducing cost and improving reliability.

Utilizing the manufacturing processes described herein, it is possible to form edge claddings on multiple gain slabs, with multiple surfaces per gain slab concurrently. In some embodiments, only a primary polishing step for the optic is required, with no polishing associated with the cladding. Embodiments of the present invention are not susceptible to bond delamination or loss of absorption, providing a fail safe design in comparison to conventional designs. Furthermore, embodiments of the present invention provide the potential, with some gain media using Samarium-doped edge cladding, and other "pump thru" cladding materials, to add the benefit of diode pumping in different geometries, resulting in a low-cost system. Depending upon the embodiment, one or more of these benefits may be achieved. These and other benefits will be described in more detail throughout the present specification and more particularly below.

Embodiments of the present invention are applicable to high energy and/or high average power Ti:sapphire laser amplifiers utilized, for example, for short pulse applications. Additionally, embodiments of the present invention are applicable to high average power laser amplifiers used in a laser-pumped-laser architecture, which can be utilized in inertial fusion energy systems.

These and other objects and features of the present invention and the manner of obtaining them will become apparent to those skilled in the art, and the invention itself will be best understood by reference to the following detailed description read in conjunction with the accompanying drawings.

DETAILED DESCRIPTION OF SPECIFIC EMBODIMENTS

During optical pumping of laser and amplifier materials (i.e., gain media), some of the excited atoms spontaneously decay, emitting photons at the frequency of a designed laser transition. Such photons can be emitted at angles greater than the critical angle for total internal reflection (TIR) so as to be trapped between a gain media's surfaces and amplified as they travel through the laser gain media. This effect is referred to as amplified spontaneous emission (ASE). In high average power disk amplifiers in particular, such ASE can be totally or partially reflected back into the disk. If the gain in traversing the disk exceeds the edge losses, then the process can proceed indefinitely. This effect is referred to as a parasitic oscillation.

As described more fully throughout the present specification, embodiments of the present invention suppress ASE and parasitic oscillations in high index (e.g., greater than about 1.5) gain media, such as a crystal laser or amplifier slab or disk or an equivalent gain medium made of ceramic.

Ti:sapphire (Ti:$Al_2O_3$) is the laser gain medium of choice for femtosecond class short pulse lasers worldwide. Short pulse lasers have applications in machining and materials processing, nuclear transformation, production of x-ray, electron, proton, neutron, and ion sources, fast ignition, and basic scientific exploration of chemical processes and dynamic structures of materials. Slabs of Ti:sapphire are optically pumped to produce a population inversion in the material which can then be used as a laser oscillator or an amplifier. As the aperture and stored energy in Ti:sapphire amplifiers increases the loss due to amplified spontaneous emission (ASE) also increases and can result in a complete loss of gain or optical damage. As discussed above, a common method to inhibit ASE in high power laser gain media is to bond a material that absorbs the laser light at the edges of the gain media (e.g., amplifier) slab.

Figure 1:
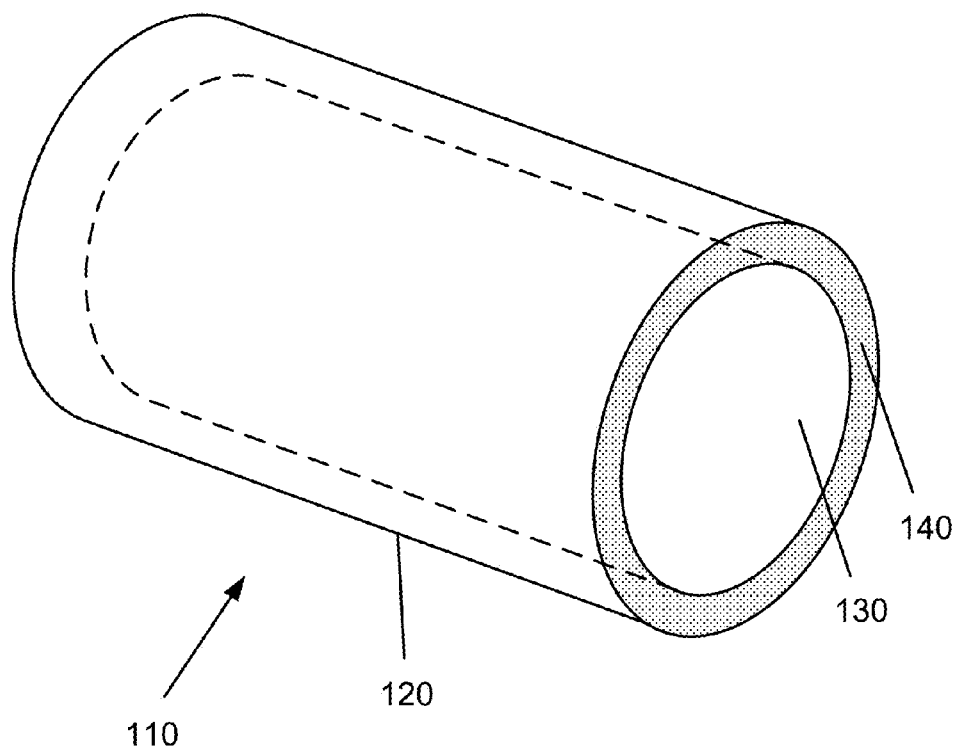
FIG. 1 is a simplified cross-sectional diagram of a gain medium with a diffused edge cladding according to an embodiment of the present invention.

FIG. 1 is a simplified cross-sectional diagram of a gain medium with a diffused edge cladding according to an embodiment of the present invention. As illustrated in FIG. 1, a new method of making an edge cladding for gain media is to diffuse atoms that absorb the laser wavelength directly into the amplifier material. The resulting gain element will suppress ASE without any further bonding or external absorbing material. In addition the gain medium and absorbing material have the same index of refraction so there are no reflections and no interfaces between the gain medium and absorber. As shown in FIG. 1, an edge-clad gain medium 110 includes a central gain region 130 and an edge-clad region 140. The longitudinal axis of the gain medium is normal to the exposed surface of central gain region 130 as illustrated in FIG. 1. The edge-clad region 140 extends from the outer edge 120 of the gain medium to a predetermined depth into the gain medium. Although the edge-clad region 140 is illustrated as a uniform density region, this is not required by the present invention and typical implementations will have a decreasing dopant density as a function of depth as described more fully throughout the present specification. The exposed surface of the gain region 130 is polished to an optical quality finish and can be coated to reduce reflection at the entrance and exit facets of the gain medium. One of ordinary skill in the art would recognize many variations, modifications, and alternatives.

Although the gain media illustrated in FIG. 1 is in a cylindrical form, resulting in disks as a finished product, the present invention is not limited to this particular geometry. In addition, gain media for lasers and amplifiers can be configured, for example, as a slab, can each have a thickness ranging approximately from about 1 mm to about 40 mm with transverse dimensions ranging from about 10 mm×10 mm to about 400 mm×400 mm or larger. Moreover, the disks or slabs, can be cut into any shape, such as, but not limited to, rectangles or polygonal shapes, squares, octagonal, ellipses, or the like. Thus, embodiments of the present invention can utilize materials with cross sections that are two-dimensional polygons. The edge cladding in these embodiments can by cylindrical or other congruent outer shapes as a shell as appropriate to the central region of the gain material.

In order to absorb ASE produced in the gain medium, the absorbing material should have a high absorption cross-section corresponding to the peak of the gain bandwidth. For Ti:sapphire lasers, which are highly tunable, the choice of the particular absorber will depend on the laser or amplifier application for which the gain media is used. The inventors have determined that for Ti:sapphire gain media operated at wavelengths of about 800 nm, $Fe^{2+}$ ions absorbing from 700 nm to 900 nm can be a suitable ASE absorber. Suitable dopant sources to provide the iron are iron oxide, iron salts, or the like.

The inventors have determined that to absorb radiation at wavelengths in the range of 800 nm, doping of Ti:sapphire at doping levels on the order of $1\times10^{17}$ $cm^{-3}$ provides for high absorption. Such doping levels can be achieved using surface irradiation, for example, provided by an ion gun. The gain medium, which may be enclosed in a material to provide additional dopant atoms) is then heated to a temperature below the melting point of the gain medium. In one embodiment, the gain medium is heated to a temperature ranging from about 1000 K to about 2300 K. In a preferred embodiment, annealing of the surface irradiated sample is performed at a temperature of 1350 K.

During the heating process, also referred to as an annealing process, the characteristics of the gain material should preferably remain unchanged while doping the absorbing region, which is also referred to as an edge-clad region. For Ti:sapphire doped with iron, the laser active element is titanium in the $Ti^{3+}$ state and the absorption at 800 nm is high for iron in the $Fe^{2+}$ state. Accordingly, during the anneal, these states should be maintained to provide both high gain in the gain region and high absorption in the edge-clad region. According to an embodiment, the anneal is performed in a reducing atmosphere for Ti:sapphire materials in order to enable annealing at longer times. In some embodiments, the temperature and time of the anneal are selected to maintain the oxidation state of the laser active ions (e.g., titanium) as well as the electronic properties of the active ion and the absorber, among other optical characteristics. Thus, embodiments of the present invention differ from conventional processes since many annealed materials do not have electronically active atoms.

Although Ti:sapphire doped with iron is discussed as an exemplary embodiment, the present invention is not limited to this particular system. Other embodiments include Nd:glass doped with copper, S-FAP doped with chromium, YAG doped with copper or chromium, YAG doped with samarium, SrF2 doped with copper or chromium, or gain media in which $Fe^{2+}$ is replaced with copper. Other suitable dopants that absorb radiation at wavelengths within the gain spectrum of the active material are also included within the scope of the present invention. One of ordinary skill in the art would recognize many variations, modifications, and alternatives.

According to embodiments of the present invention, a method of forming an edge cladding without bonding is provided, resulting in little to no difference in the index of refraction between the gain region and the absorbing region. Another advantage provided by embodiments of the present invention is that the methods and systems described herein enable fabrication of edge cladding structures free from bonding processes, which typically involve highly polished surfaces and other complicated fabrication techniques.

According to embodiments of the present invention, a method of making an edge cladding for gain media includes diffusing atoms of an electromagnetic absorber material directly into the peripheral portions of the gain media (e.g., an amplifier slab). This method provides benefits not available using conventional techniques by providing an inherently fail safe operation under high average power loading since there is no possibility of delamination, burning, scratching, or leaking, which could diminish the ability of the absorber to control the ASE. The cladding is also inherently index matched since it shares the same substrate material as the gain medium in the center of the amplifier or laser slab/cylinder. Even if a small index variation is induced by the electromagnetic absorber, the spatial distribution resulting from the diffusion or implantation/anneal process results in a slowly varying change in the index of refraction through the absorber region, producing a reflection coefficient near zero.

According to a first embodiment of the present invention, thermal diffusion is utilized to edge-clad the gain media. According to a second embodiment of the present invention, ion implantation is utilized to introduce the absorbing material into the peripheral portions of the gain media. Both of these embodiments are described more fully throughout the present specification and more particularly below. Some similarities are shared between these two embodiments, for example, starting with a core drilled preform that has the desired final diameter of the gain media. This final diameter includes the edge-clad region since no additional materials are bonded to the gain media according to these embodiments.

Figure 2:
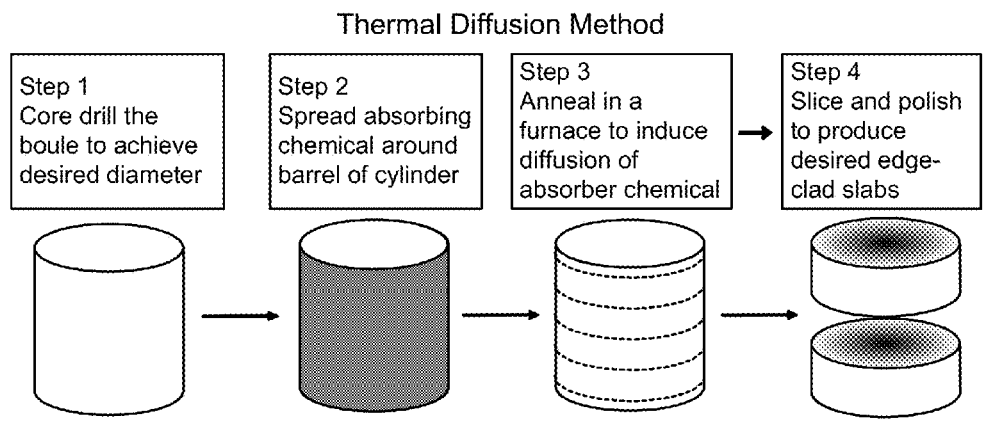
FIG. 2 is a simplified diagram illustrating a method of fabricating a gain medium with a diffused edge cladding using thermal diffusion according to an embodiment of the present invention.

FIG. 2 is a simplified diagram illustrating a method of fabricating a gain medium with a diffused edge cladding using thermal diffusion according to an embodiment of the present invention. Referring to FIG. 2, the preform 210 (also referred to as a barrel) of gain media is core drilled from a boule to provide a barrel having the final desired thickness. The length of the preform 210 will depend on the particular applications for which the gain medium will be utilized. Examples of gain media suitable for edge cladding are: neodymium doped gadolinium gallium garnet (GGG"), neodymium doped yttrium aluminum garnet (Nd:YAG), ytterbium doped yttrium aluminum garnet (Yb:YAG), Ti:sapphire (Ti: $Al_2O_3$), ruby ($Cr:Al_2O_3$), and alexandrite ($BeAl_2O_4:Cr^{3+}$).

The dopant source 212 is then placed in contact with the outer edges of the preform as illustrated in FIG. 2. In one embodiment, the absorbent material includes $Fe^{2+}$ ions diffused from iron(II) oxide. The oxide can be applied as a paste with an organic carrier. In an exemplary embodiment, in order to provide the dopant that is diffused into the gain medium, the gain medium may be packed in the dopant source, with the perimeter of the gain medium wrapped or enclosed in the dopant source. The ends of the preform (i.e., the top and bottom as illustrated in FIG. 2) may be maintained free from the dopant material or may be placed in contact with the dopant material depending on the particular implementation. Since the amplified light will pass along the longitudinal axis of the gain media, the absorber is only utilized in peripheral portions of the gain media (i.e., the cylindrical sides of the preform).

Spectroscopic methods can be used to determine dopants with absorption features that provide for wideband absorption profiles over the wavelength range of interest (e.g., 700-900 nm for Ti:sapphire). The size of the dopant is also typically analyzed to minimize crystal defects associated with the introduction of the dopant atoms. Dopant levels are selected based on the absorption cross-sections of the dopant atoms measured from samples or from calculated values, for example, $T \propto e^{-\alpha l} = e^{-N\sigma l}$, where T is the transmission, $\alpha$ is the absorption coefficient, l is the thickness of the edge cladding, N is the dopant concentration, and $\sigma$ is the absorption cross-section. Typical concentrations for embodiments of the present invention range from about $10^{16}$ to $10^{21}$ per cm$^3$.

Referring once again to FIG. 2, the preform enclosed using the electromagnetic absorber (i.e., the enclosed gain media) is placed in a vacuum furnace and heated to a temperature of approximately 1300° C. to approximately 1800° C. At these temperatures, the absorber material (e.g., iron(II) oxide) will typically transition into the liquid or vapor phase. During this thermal treatment process, the absorber ions (e.g., $Fe^{2+}$ ions) diffuse into the bulk gain media to form an electromagnetic absorbing region at the peripheral portions of the gain media. The edge-clad preform is then cooled once the desired amount of diffusion has occurred.

The preform with diffused absorbing ions is then cut as illustrated by structure 213 and the sliced gain media are polished on the entrance and exit surfaces to provide optical quality surfaces. Two finished edge-clad gain media are illustrated as 214a and 214b. In these finished products, the top and bottoms are optical quality surfaces and the central region extending along the longitudinal direction of the preform is unchanged from the original state, for example, Ti:sapphire gain media. The peripheral region includes the absorber ions, providing for absorption of light propagating in the transverse direction. The circular slabs 214a and 214 cut from the central portion of the preform can then be used in laser and amplifier applications.

In an alternative embodiment, the gain medium, for example, an amplifier slab, is polished prior to the edge cladding process. In another alternative embodiment, multiple gain media are processed in parallel, for example, enclosing the various gain medium in the electromagnetic absorber material, placing the packages in the furnace, and then thermally diffusing the dopant ions at the same time. Thus, high volume production techniques are included within the scope of the present invention. These alternative embodiments are also applicable to the ion implantation method discussed below. One of ordinary skill in the art would recognize many variations, modifications, and alternatives.

Figure 3:
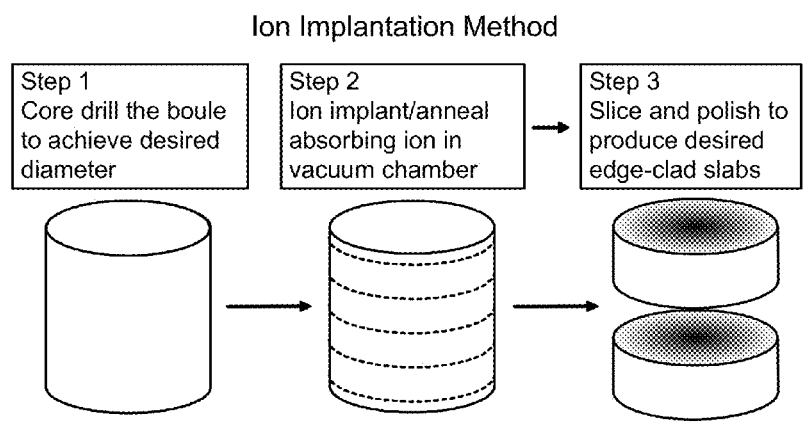
FIG. 3 is a simplified diagram illustrating a method of fabricating a gain medium with a diffused edge cladding using ion implantation according to an embodiment of the present invention.

FIG. 3 is a simplified diagram illustrating a method of fabricating a gain medium with a diffused edge cladding using ion implantation according to an embodiment of the present invention. In the method using ion implantation to introduce the dopant ions into the peripheral portions of the gain medium, the preform 220 of gain media is core drilled from a boule to provide a preform having the final desired thickness. The length of the preform 220 will depend on the particular applications for which the gain medium will be utilized. The preform is placed in a vacuum chamber and bombarded with an ion source such as $Fe^{2+}$ ions to achieve the desired absorption in the edge-clad region. Typical ion densities during this ion implantation process range from about $1 \times 10^{16}/cm^3$ to about $1 \times 10^{21}/cm^3$. In a particular embodiment, the ion density is $0.5 \times 10^{20}/cm^3$. Typically, an annealing process is performed after the ion implantation process. A thermal anneal as discussed above is performed in an exemplary embodiment. The implanted preform is removed from the vacuum chamber and sliced and polished as discussed in relation FIG. 2. As illustrated in FIG. 3, the ion implanted preform is sliced as illustrated in structure 220 and then the sliced gain media are polished on the top and bottom surfaces to provide the edge-clad gain media 224a and 224b.

Figure 4:
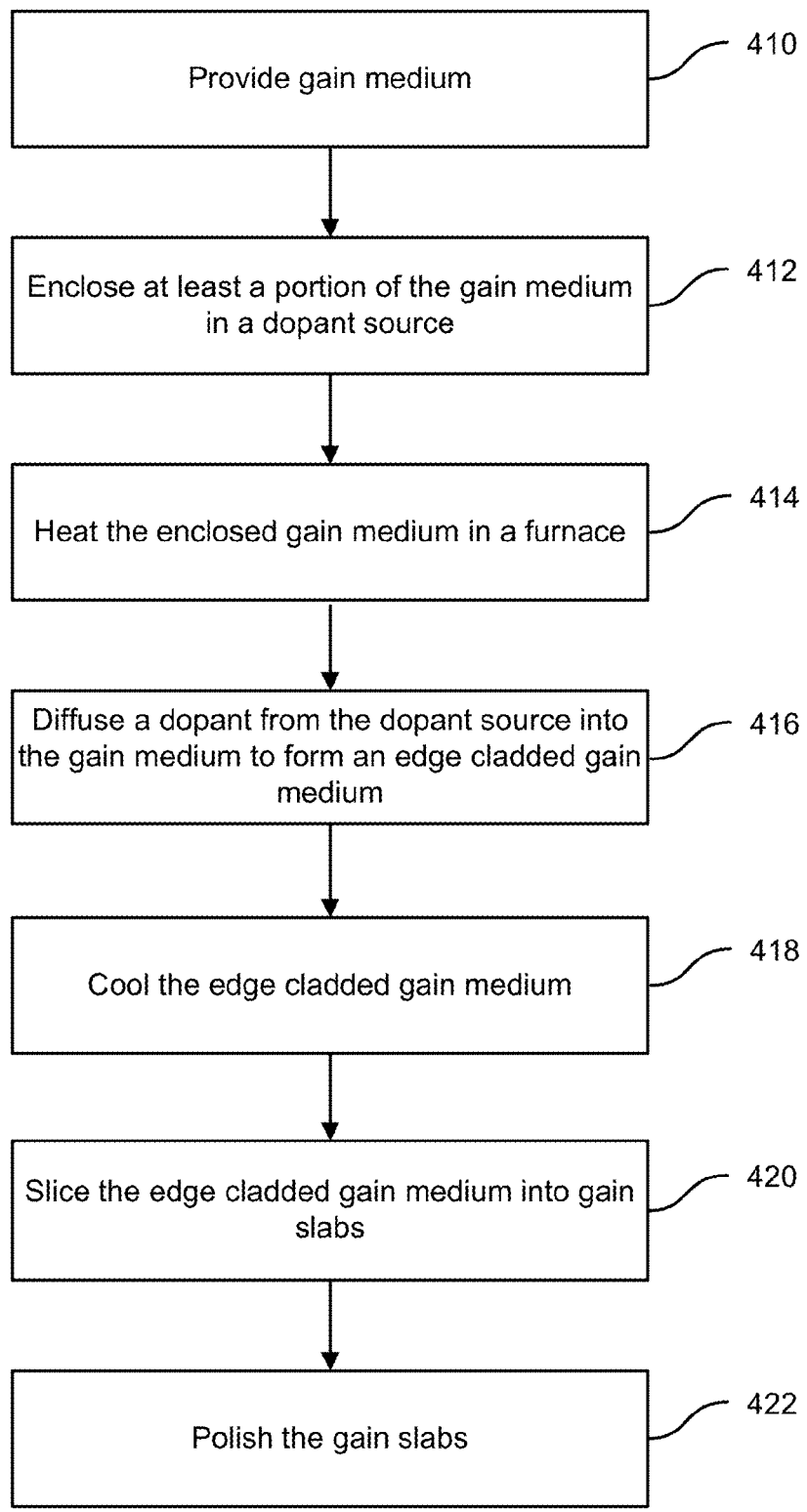
FIG. 4 is a simplified flowchart illustrating a method of fabricating a gain medium with a diffused edge cladding using thermal diffusion according to an embodiment of the present invention.

FIG. 4 is a simplified flowchart illustrating a method of fabricating a gain medium with a diffused edge cladding using thermal diffusion according to an embodiment of the present invention. Referring to FIG. 4, the method includes providing the gain medium (410) and enclosing at least a portion of the gain medium in a dopant source (412). The gain medium can be an amplifier slab, for example, a Ti:sapphire amplifier slab. The dopant source can be iron oxide in an embodiment. The method also includes heating the enclosed gain medium in a furnace (414) and diffusing a dopant from the dopant source into the gain medium to form an edge-clad gain medium (416). The dopant can be $Fe^{2+}$ in an embodiment. In one implementation, heating the enclosed gain medium includes performing a furnace anneal process at about 1000 K to about 2300 K, for example, at about 1350K. The edge cladding region of the edge-clad gain medium is typically a peripheral portion of the gain medium as described herein, forming a cylindrical shell of doped gain material in some embodiments.

The method further includes cooling the edge-clad gain medium (418), slicing the edge-clad gain medium into gain slabs (420) or rods, and polishing the gain slabs (422) or rods. In some embodiments, the gain slabs or gain rods are referred to as gain units. According to an embodiment of the present invention, the method 400 provides a cylindrical boule having a top, a bottom opposing the top, and sides extending between the top and the bottom. The sides of the cylindrical boule are enclosed in the dopant source.

In some embodiments, a predetermined gap is provided between the dopant source and the gain medium during the process of enclosing at least a portion of the gain medium in the dopant source. In these embodiments, the gas from vaporization comes into contact with the gain medium in order to introduce the dopant into the gain medium.

It should be appreciated that the specific steps illustrated in FIG. 4 provide a particular method of fabricating a gain medium with a diffused edge cladding using thermal diffusion according to an embodiment of the present invention. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

Figure 5:
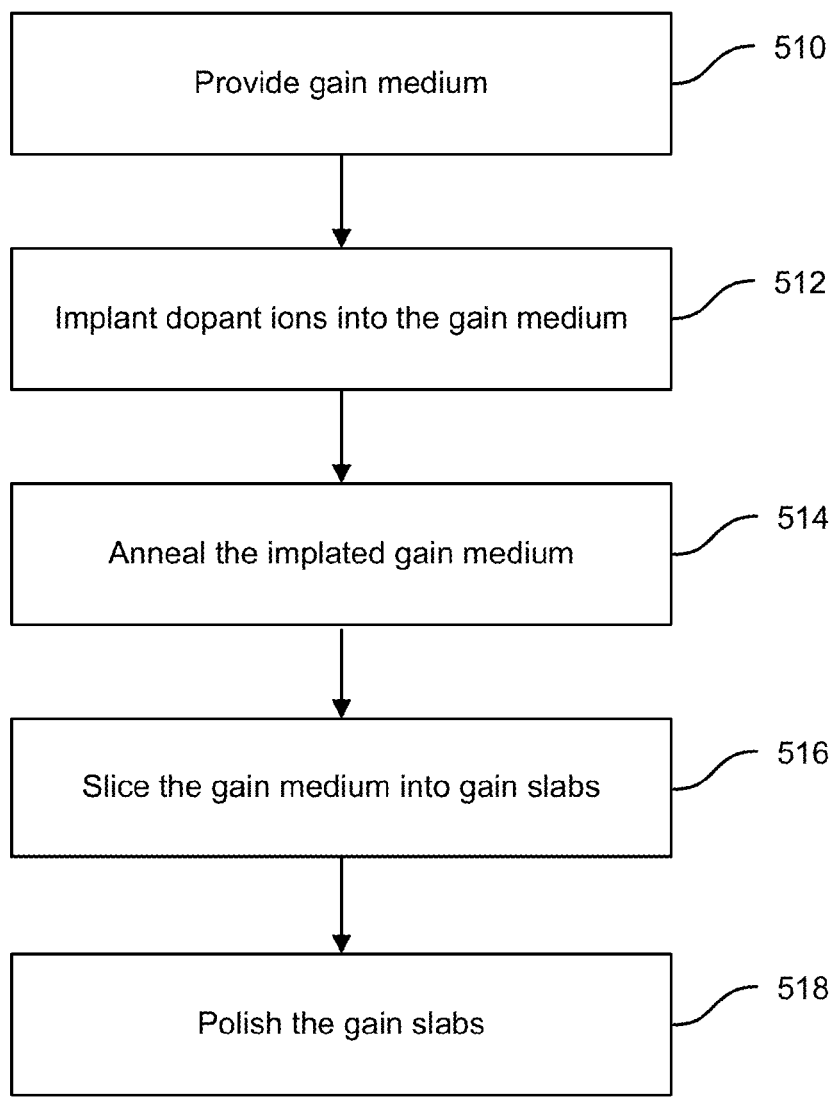
FIG. 5 is a simplified flowchart illustrating a method of fabricating a gain medium with a diffused edge cladding using ion implantation according to an embodiment of the present invention.

FIG. 5 is a simplified flowchart illustrating a method of fabricating a gain medium with a diffused edge cladding using ion implantation according to an embodiment of the present invention. Referring to FIG. 5, the method includes providing a gain medium operable to amplify light at a gain wavelength (510) and implanting ions operable to absorb light at the gain wavelength into a peripheral region of the gain medium (512). One of several implantation processes can be used to implant the ions in the peripheral region of the gain medium. As an example, the gain medium can be a Ti:sapphire boule or other suitable gain material. In a particular embodiment, the gain medium is a cylindrical boule having a top, a bottom opposing the top, and sides extending between the top and the bottom. The ions are implanted into the sides of the cylindrical boule or preform.

The method also includes annealing the implanted gain medium to form the edge-clad gain medium (514), for example at a temperature between about 1000 K to about 2300 K, slicing the edge-clad gain medium into gain slabs or rods (516) and polishing the gain slabs or rods (518). The ions, after annealed can be iron in the $Fe^{2+}$ state. After the implanting and annealing processes, the concentration of the ions in the peripheral region of the gain medium can range from about $1\times10^{16}/cm^3$ to about $1\times10^{21}/cm^3$. In an embodiment, the gain slabs or rods are polished to form substantially planar surfaces on sides exposed to light during amplification operations.

It should be appreciated that the specific steps illustrated in FIG. 5 provide a particular method of fabricating a gain medium with a diffused edge cladding using ion implantation according to an embodiment of the present invention. Other sequences of steps may also be performed according to alternative embodiments. For example, alternative embodiments of the present invention may perform the steps outlined above in a different order. Moreover, the individual steps illustrated in FIG. 5 may include multiple sub-steps that may be performed in various sequences as appropriate to the individual step. Furthermore, additional steps may be added or removed depending on the particular applications. One of ordinary skill in the art would recognize many variations, modifications, and alternatives.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A gain medium operable to amplify light at a gain wavelength and having reduced transverse ASE, the gain medium comprising:
   an input surface;
   an output surface opposing the input surface;
   a central region including gain material and extending between the input surface and the output surface along a longitudinal optical axis of the gain medium, wherein the central region is characterized by an index of refraction; and
   an edge cladding region surrounding the central region and extending between the input surface and the output surface along the longitudinal optical axis of the gain medium, wherein the edge cladding region comprises the gain material and an absorbing dopant, wherein the edge cladding region is characterized by the index of refraction.

2. The gain medium of claim 1 wherein the central region is cylindrical.

3. The gain medium of claim 1 wherein a cross section of the central region comprises a two dimensional polygon.

4. The gain medium of claim 1 wherein the edge cladding region is a cylindrical shell.

5. The gain medium of claim 1 wherein the edge cladding region comprises a congruent outer shape as a shell.

6. The gain medium of claim 1 wherein the gain medium comprises Ti:sapphire.

7. The gain medium of claim 1 wherein a concentration of the dopant ranges from about $10^{16}$ to $10^{21}$ per $cm^3$.

8. The gain medium of claim 7 wherein the concentration of the dopant is about $0.5\times10^{20}/cm^3$.

9. The gain medium of claim 1 wherein the dopant comprises $Fe^{2+}$ ions.

10. The gain medium of claim 1 wherein the absorbing dopant is operable to absorb light at the gain wavelength.

* * * * *